Figure 1:
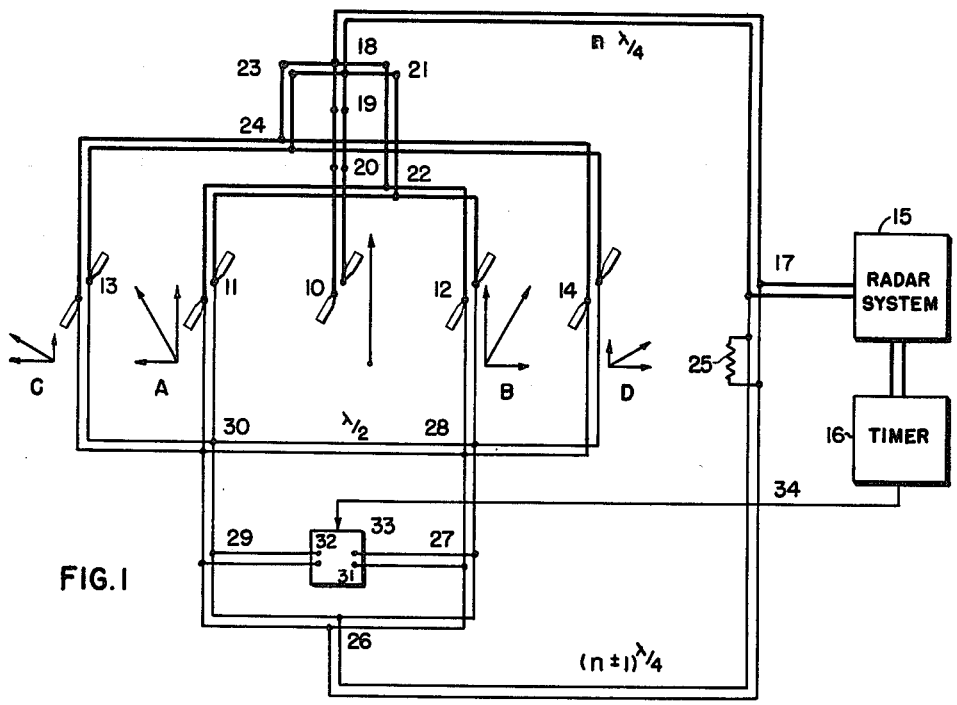

April 21, 1953     L. HATKIN ET AL     2,636,124
ANTENNA ARRAY SYSTEM
Filed May 1, 1950

INVENTOR.
LEONARD HATKIN
JOHN RUZE
BY
Harry M. Saragovitz
Attorney

Patented Apr. 21, 1953

2,636,124

UNITED STATES PATENT OFFICE 2,636,124

ANTENNA ARRAY SYSTEM

Leonard Hatkin, Elberon, N. J., and John Ruze, Cambridge, Mass., assignors to the United States of America as represented by the Secretary of the Army Application May 1, 1950, Serial No. 159,352

9 Claims. (Cl. 250—33.53)

(Granted under Title 35, U. S. Code (1952), sec. 266)

The invention described herein may be manufactured and used by or for the Government for governmental purposes, without the payment of any royalty thereon.

This invention relates to linear antenna arrays and in particular to linear arrays of the type employed in radar systems. Particularly this invention relates to a circuit for supplying to the antenna elements of an array wave energy of chosen amplitude and phase in a manner to facilitate lobe switching.

Antenna arrays of the type under consideration are described in nearly all radio text books, for example, in Terman's "Radio Engineers' Handbook," McGraw-Hill Book Co. 1943, pages 823–824. Lobe switching of such arrays is also disclosed in many places in recent literature particularly in the volume, "Principles of Radar" prepared by the Staff of M. I. T. Radar School, chapter 4. Therefore only such description of the characteristics of an array necessary to the illustration of the present invention will be given here.

The linear array is composed of a plurality of pairs of conjugate antenna elements symmetrically spaced along an axis relative to a center location, which may, in the case of an odd number of elements, be the location of a center element. The currents fed to elements of the conjugate pairs are of equal amplitude and of conjugate phase. The term "conjugate phase," as here employed, means that the sign of the phase angle of the currents is opposite in elements of a pair.

Ordinarily a uniform spacing between elements is employed which is of the order of a half wave length so that a single major directive lobe is produced. A lobe of maximum directivity is obtained when the currents in the elements are equal but it is well known that tapering the currents so that the elements spaced further from the center location receive less current results in a desirable reduction of the amplitude of minor lobes, although the width of the major lobe is increased to some extent.

If the currents to the several elements are all of like phase, the directive pattern is normal to the axis of the array. However, by proper choice of the conjugate phasing of the elements the directive lobe will be tilted by a chosen angle from normal. If the conjugate phasing is reversed for each pair of elements the lobe is tilted by the same angle in a conjugate direction, that is, it will be shifted from, say, plus 5° of normal to minus 5°. In many radar systems a shifting of the directive lobe is effected either alternately with the radar pulsing or at an arbitrarily chosen rate so that echo signal obtained from a reflecting object with the two different directivities may be compared. Echoes which are of equal amplitude when received with both directivities are then known to originate from an object precisely located on a line where the amplitude of the overlapping directive lobes are equal. This type of operation is known as lobe switching.

In prior art arrangements the elements of the array are fed from transmission lines of chosen lengths and chosen characteristic impedances in order to supply the currents of requisite phase and amplitude to the several elements. For the lobe switching operation the currents are fed asymmetrically to the array to provide the conjugate phase required. The asymmetrical feed point is shifted in accordance with the lobe switching and in this operation the entire power to the array must be switched. In these arrangements it has been difficult to design the feed circuits to provide proper amplitude and phase to each element in a circuit so organized that the lobe switching operation may be accomplished. It has therefore been the practice to arbitrarily space the array elements a half wave length apart to simplify the phasing problem and to ignore the tapering of currents to the elements and instead supply currents of equal amplitude to each element.

It is accordingly an object of the present invention to provide an improved antenna array arrangement which avoids one or more of the disadvantages and limitations of the prior art arrangements and which has improved operating features.

A further object of this invention is to provide in a linear antenna array an improved arrangement for supplying wave energy of a chosen frequency in predetermined amplitude and in conjugate phase relation to conjugate pairs of antenna elements.

It is a further object of the present invention to provide in a linear antenna array an improved arrangement for radar lobe switching which involves switching only a portion of the energy supplied to the array.

Also, in accordance with the present invention, in a lobe switching linear antenna array having conjugate pairs of antenna elements symmetrically spaced relative to a center position, there is provided a system for supplying to the elements of each conjugate pair, energy of a chosen frequency in predetermined amplitude and in conjugate phase relation. The energy supplied to each element is resolvable into a component of reference phase and a component of quadrature phase. The system comprises, for each pair, passive circuit means, such as a hybrid ring circuit for independently supplying the components of reference phase to the elements of each pair and the components of quadrature phase in anti-phase relation to the elements of each pair. Further means are provided for periodically reversing the anti-phase relation in order correspondingly to reverse the conjugate phase relation.

For a better understanding of the present invention, together with other and further objects thereof, reference is had to the following description taken in connection with the accompanying drawings and its scope will be pointed out in the appended claims.

Figures 2, 3:
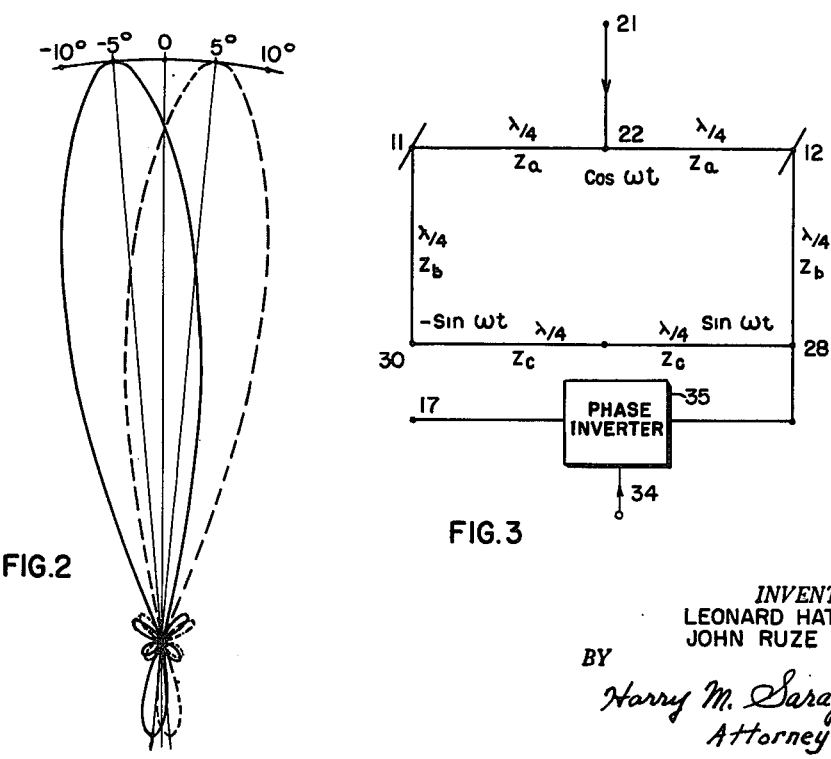

In the drawings, Fig. 1 is a diagram partly in block and partly schematic illustrating a lobe switching antenna array in accordance with a preferred form of the invention; Fig. 2 is a polar diagram illustrating the directivity characteristics of the array shown in Fig. 1; and Fig. 3 is in part a simplified diagram illustrating the operation of an essential part of the circuit of Fig. 1 and including in block diagram an alternative arrangement for accomplishing the lobe switching operation.

Referring now to Fig. 1 of the drawings, the elements of a linear antenna array are shown as a central dipole antenna element 10, a first conjugate pair of dipoles 11 and 12, and a second conjugate pair of dipoles 13 and 14 symmetrically spaced from the center position occupied by element 10. A complete radar unit for transmitting and receiving pulses of radio frequency energy is indicated by the block unit 15. Coupled to 15 is a timer unit 16 which controls the pulsing operation of 15.

In a pulsing radar system as is well known, pulses of radio frequency energy are transmitted at a chosen repetition rate and during the intervals between pulses echoes from reflecting objects are received. It is well known that antenna systems of the type here under consideration operate with the same directivity in the receiving operation as in the transmission. Such reciprocal operation is ordinarily referred to as operation in accordance with the reciprocity theorem. Accordingly, the description of the system will here be confined entirely to operation of the system as a transmitter and it will be understood in both the description and in the appended claims that the reciprocity theorem holds true for the case of reception.

Considering then the circuit arrangement, from the transmitting point of view only, the radar transmitter 15 is coupled to the array elements via two channels by means of the two transmission lines which join at point 17. Following the upper part of the diagram the transmission line from point 17 to the point 18 is, as labeled on the drawing, of an integral number, $n$, of quarter wave lengths. It will be noted that the points where the lengths of line connect are indicated by pairs of dots and it will be understood that the length of transmission line, coaxial cable or whatever may be used is a quarter of a wave length between pairs of dots unless it is otherwise specifically labeled on the drawing. Thus, from the junction point 18 three quarter wave length sections, that is, sections 18—19, 19—20 and 20—10 are shown in the line which supplies wave energy to element 10. From junction 18 for the conjugate pair 11, 12 the length of the transmission line is also comprised of three quarter wave length sections. These are the quarter wave length sections 18—21, 21—22 and the branching pair 22—11 and 22—12. In similar manner it will be noted that the length of transmission line from the junction point 18 to the conjugate pair of elements 13, 14 is also via three quarter wave length sections, to wit, 18—23, 23—24, 24—14 and 24—13.

It will be clear that the electrical length from the junction point 17 via the upper path described is the same number of wave lengths to each of the five antenna elements and therefore the currents supplied to each of these will be in time phase. These in-phase currents will be referred to as of reference phase and the arrangement accordingly constitutes means for supplying wave energy components of reference phase to the elements of the array. To indicate this clearly small vector diagrams have been placed adjacent to each of the elements and it will be noted that a vertical component of current is indicated as being supplied by the upper or in-phase network to each element of the array.

Consider now the lower part of the circuit from the junction 17, which is termed the anti-phase network and which constitutes means for supplying the components of quadrature phase in anti-phase relation to the antenna elements of each conjugate pair. It will be noted that the electrical length as labeled on the drawing from point 17 to point 26 is also an integral number of quarter wave lengths but differs by a quarter wave length from the principal transmission line 17—18, of the upper or in-phase network. From junction point 26 connection is made to elements 12 and 14 via the quarter wave length sections 26—27, 27—28 and the branching pair 28—12 and 28—14. In similar manner the elements 11—13 are connected to point 26 by the quarter wave length sections 26—29, 29—30 and the branching pair 30—11 and 30—13. Between junctions 28 and 30 there is a transmission line section of a half wave length.

In the anti-phase network, there is also provided a lobe switching unit of conventional type to which the quarter wave length sections 27—31 and 29—32 are coupled. Operation of the lobe switching unit is accomplished in synchronism with the pulsing of the radar by control means indicated by the connection labeled 34 between timer 16 and the lobe switching unit 33. However the lobe switching need not be synchronous with the radar pulsing and may be accomplished on an arbitrarily chosen rate. Shunting the line 17—26 is a stabilizing resistor 25 the function of which will be later described.

The exact structure of lobe switch unit 33 is not illustrated since it may be of any conventional known form such as that shown in Fig. 40, page 9-64 of the volume "Principles of Radar" referred to above. For one operational position of the lobe switching unit 33 the current supplied to the antenna elements 12 and 14 are indicated as horizontal current components in the vector diagrams B and D. For the antenna elements 11 and 13 similar anti-phased horizontal current components are indicated in the vector diagrams A and C.

Considering now the operation of the system, the radar transmitter supplies wave energy of a chosen frequency and magnitude via the connection shown from unit 15 to the junction point 17. At point 17 the energy is divided between the upper in-phase circuit network and the lower anti-phase network. At junction 18 the current is divided between three paths, one path being sections 18—19, 19—20 and 20 to element 10 where current of the magnitude indicated by the vertical vector is supplied. Current from junction 18 is supplied via quarter wave sections 18—21 and 21—22 where it is divided and supplied in equal amplitude and in like reference phase to elements 11 and 12 as indicated by the vertical vectors of the diagrams A and B. The amount of current fed to these elements is determined by the characteristic impedance of the transmission line sections and the values of characteristic impedance to be chosen can be determined for each section by calculation employing transmission line equations. The antenna elements of the array are here assumed to be of similar characteristic impedance and the value of the current supplied to the elements is determined and the arrangement is such as to match the lines to the characteristic impedance of the elements by designing the sections 18—21, 21—22 and from 22 to the elements 11 and 12 as quarter wave matching sections, i. e., quarter wave transformers. It will be noted that here there is no problem of relative phasing since all line sections are of a quarter wave length and the length of path from junction 17 to the antenna elements is the same so that the current components supplied to the conjugate pair will be of the same phase as the current supplied to element 10, that is, they will be of reference phase. In similar manner from junction 18 via the quarter wave length sections 18—23, 23—24 and the quarter wave sections leading to elements 13 and 14 currents of suitable amplitude and of reference phase are supplied thereto. It may be noted here and it will be explained more fully later that the currents supplied by the in-phase network and those supplied by the anti-phase network are considered to energize the antenna elements independently of each other.

Considering now the anti-phase network, the feed line from junction point 17 to point 26 is chosen of suitable characteristic impedance to provide in this branch the desired amount of the total current, taking into consideration the portion of current dissipated in the shunt resistor 25 so that suitable amplitude is supplied at junction 26. The lobe switching circuit as before mentioned is of a conventional type known in the art and its operation may be described as follows. Assume a time in the operation when the lobe switching unit 33 effectively short circuits the terminal 31 of quarter wave section 31—27 and leaves the terminal 32 of quarter wave section 32—29 open. The effect is then to disconnect the section 31—27 at junction 27 and to short circuit the section 32—29 at the junction point 29. Under these conditions the path 26, 29, 30 may be considered as having been completely removed from the circuit and that all energy is supplied via the path 26, 27, 28. It will be clear then that current from the junction 28 is supplied in equal amplitude and like phase to elements 12 and 14 and likewise in equal amplitude but in anti-phase to elements 11 and 13 because of the fact that the path 28—30 is a half wave length and therefore causes the anti-phasing or change of 180° in the currents supplied to these elements.

It will also be noted that the path 17—26 is labeled $(n+1) \lambda/4$ to indicate its length is an integral number of quarter wave lengths but differing by one quarter wave length from the length of path 17—18 of the in-phase network. It will be clear, therefore, that the currents supplied to the several antenna elements via the anti-phase network are in quadrature phase relation to those currents supplied in reference phase by the in-phase network. The quadrature currents are therefore as indicated by the horizontal vectors in the vector diagrams A, B, C and D. The resultant conjugate currents are indicated by the sum vectors in these vector diagrams.

If now the lobe switching unit 33 operates to short circuit the quarter wave section 32—29 at point 32 and to open line 31—27 at point 31, then it will be clear that in effect the path 26, 27, 28 has been removed from the circuit and the path 26, 29, 30 has been placed in operation. Under these conditions the quadrature components of current shown in vector diagrams A and C will be reversed since the length of the path to elements 11 and 13 has been decreased by a half wave length. Conversely the length of path to elements 12 and 14 is increased a half wave length by the section 30—28 and the quadrature currents in the diagrams B and D will also be reversed. In other words, the currents supplied by the in-phase network are left fixed in the lobe switching operation while the quadrature currents supplied by the anti-phase network are reversed with each operation of lobe switch 33 effectively to reverse the conjugate phasing of currents supplied to the conjugate pairs of antenna elements. It will be clear therefore that the lobe switching operation is effected by switching only a portion of the energy supplied to the array.

Fig. 2 shows a polar diagram of the directivity pattern of the array of Fig. 1 for an actual structure where the currents supplied to the elements are proportioned as follows:

| Element | 13 | 11 | 10 | 12 | 14 |
|---|---|---|---|---|---|
| Reference current | 1 | 3 | 4.16 | 3 | 1 |
| Quadrature number | $j\pm1.49$ | $j\pm1.49$ | 0 | $j\mp1.49$ | $j\mp1.49$ |
| Normalized Conjugate Current | 1.0/±56° | 1.85/±26° | 2.3 | 1.85/∓26° | 1.0/∓56° |

The conjugate currents are each the vector sum of the reference current and the quadrature current. In the row labeled normalized conjugate current the values have been divided by a factor to make the currents in the end elements unity so that the amount of tapering can more easily be visualized.

The diagram shows the directivity in a horizontal plane for dipole elements oriented to provide a vertically polarized wave. The pattern is unidirectional because the array elements are mounted approximately a quarter wave length in front of a non-resonant reflecting screen. The spacing of the elements is 0.625 wave length and screen separators were located between the dipole elements to reduce mutual coupling between them. The antenna elements instead of being directly connected to the line sections as shown in Fig. 1, are connected each via a half wave length of transmission line since the insertion of low loss line sections of a multiple of a half wave length leading to the antenna elements does not alter the described operation. The in-phase and anti-phase networks may therefore be constructed as units separated from the actual array.

For one position of the lobe switching the major lobe is in a direction of +5° from the direction normal to the axis of the array as shown by dotted lines. For the other lobe switching position the major lobe has a direction of —5° from the normal as shown by solid line. It will be noted in this diagram that the minor lobes are materially reduced in magnitude.

Thus far it has been assumed that the in-phase and the anti-phase networks operate independently to feed wave energy to the antenna elements without interaction one upon the other. It will now be explained, with the aid of the diagram, Fig. 3, why the two networks operate independently. Thus in Fig. 3 the part of the diagram including elements 11 and 12 is shown in simplified form and it will be noted that the circuit connecting points 22, 11, 30, 28, 12 and back to 22 is a closed circuit or ring the total electrical length of the ring being one and a half wave lengths. The in-phase or reference phase feed connecting at junction 22 and indicated by the notation Cos $wt$, is a quarter wave length from both elements 11 and 12 to supply in-phase currents to these elements. If we consider the current as also travelling to, say, element 11 via the path 22, 12, 28, 30, 11, it will be noted that this distance is one and a quarter wave lengths so that current travelling via this path from 22 will also arrive at element 11 in-phase. Similarly currents from junction 22 may reach element 12 by either path around the ring and arrive in time phase. However, it will be noted that currents entering at junction 22 and travelling both ways will arrive at point 28 and also at point 30 in opposite phase. Therefore no energy from point 28 can leave the circuit as the voltage there is zero. Point 28 is therefore a balance point and similarly point 30 is a balance point.

Considering the energy of quadrature phase supplied to the network at point 28 and indicated by the notation Sin $wt$, this energy can reach element 12 directly by the quarter wave length path from 28 or via the path thru points 28, 30, 11, 12 in both of which cases the energy arrives at 12 in time phase. However, the energy from point 28 will reach element 11 in anti-phase to the energy reaching element 12; that is, it will arrive in phase at 11 by both paths around the ring but will be 180° out of phase with energy arriving at element 12. The anti-phasing is indicated by the notation —Sin $wt$ at point 30. However, at point 22, it will be noted, that energy entering at point 28 will reach 22 in opposite phase over the two paths and therefore point 22 is a balance point so that no energy supplied to the circuit at point 28 (and similarly at point 30) can leave the circuit at point 22.

The arrangement thus far described is termed a hybrid circuit and the particular form is a hybrid ring circuit of the type described in U. S. Patent No. 2,445,895 issued July 27, 1948 in the name of W. A. Tyrrell. For many years, hybrid circuits have been employed for balancing in telephone repeater systems where the circuit takes the form of the well known hybrid coil or transformer and from this art the term hybrid originates. The term has been carried over into the ultra high frequency or microwave radio and radar art and throughout the literature references will be found to hybrid junctions and hybrid T's. For example, the hybrid T and its relation to the earlier form of hybrid transformer is explained at pages 7-11 to 7-13 in the Radio Engineers' Handbook—Henney, 4th edition, Mc-Graw-Hill & Company, 1950. Examples of hybrid junction circuits will also be found at page 353 of Reference Data for Radio Engineers, 3rd edition, 1949, published by Federal Telephone & Radio Corporation. The term hybrid circuit as here employed is intended to designate a duplex balancer circuit which may be of either the wave guide junction type or the transformer circuit type.

Referring back to Fig. 1, it will be clear that the in-phase and anti-phase branches which supply currents to the other conjugate pair of elements 13 and 14 also comprise a hybrid ring such as described in Fig. 3 and that the path of a half wave length, 28—30, is common to both the hybrid ring supplying elements 11 and 12 and the ring supplying elements 13 and 14. The hybrid circuit is therefore a passive circuit network which independently supplies current components of reference phase to the antenna elements of a conjugate pair and simultaneously supplies the components of quadrature phase in anti-phase relation to the elements of the pair. Also the lobe switching network of Fig. 1 when it is actuated under control of timer 16 via the connection 34 or by other means, comprises a means for periodically reversing the anti-phase relation correspondingly to reverse the conjugate phase relation of the currents supplied to a conjugate pair of elements.

The operation as illustrated and described for Fig. 1 of the lobe switching arrangement effectively operates alternately to connect the anti-phase network at points 28 and 30 but it will be evident that alternative arrangements are possible. Thus in Fig. 3 a phase inverter is indicated in block diagram as unit 35 to which the quadrature currents from junction 17 are supplied and the output of the phase inverter 35 is connected only to junction point 28. The phase inverter 35 is assumed to be a device of any well known type which may operate as a switch to reverse the polarity of wave energy supplied to its input. For example a polarity inverting electron tube stage or any arrangement which will operate to switch a half wave length section of line into the path might be so employed. Thus for one condition of operation of phase inverter 35 the quadrature currents are supplied at terminal 28 exactly as was previously described. However when, under control of the connection 34 the phase inverter 35 operates to reverse the polarity of current supplied to junction 28, it will be clear that the quadrature components are all reversed in polarity (phase) to provide exactly the same result as obtained when the connection was switched from point 28 to point 30. The phase inverter 35 therefore operates periodically to reverse the anti-phase relation of the quadrature currents supplied to the antenna elements of conjugate pairs correspondingly to reverse the conjugate phase relation of the resultant currents supplied to the pairs.

Because of the balanced relations, above described for the Fig. 3 ring circuit, the in-phase part of the circuit can be considered completely independent of the anti-phase part of the circuit. Thus the sections 22—11 and 22—12 may be designed as quarter wave matching sections of impedance $Z_a$ (as labeled) to match the line 21—22 to elements 11 and 12 and provide equal in-phase currents thereto.

Similarly the sections 28—12 and 30—11 may be designed as quarter wave matching sections of impedance $Z_b$ (as labeled) independently to match the line 27—28 to elements 11 and 12 and provide equal quadrature phase currents thereto. The half-wave length section 28—30 may have any other arbitrarily chosen characteristic impedance $Z_c$ (as labeled) without affecting the operation since the purpose of this section is to anti-phase the quadrature currents supplied to the elements and the properties as a half wave section are such as to provide anti-phasing independently of the characteristic impedance.

Referring again to Fig. 1, it was pointed out that lines 17—18 and 17—26 differ in electrical length by a quarter wave length to provide the quadrature relation between currents supplied by the in-phase and anti-phase networks. If now we make $n$ an even integer so that line 17—18 is an even number of wave lengths it will be seen that the electrical length to the array elements is an odd number at quarter wave lengths for the in-phase network and an even number of quarter wave lengths for the anti-phase network. For the in-phase network advantage can now be taken of a known theorem in transmission lines, namely that the currents supplied from a source to a load via a line of an odd number of quarter wave lengths will be independent of the impedance of the load. Consider the well known formula for a lossless transmission line $$I_R = \frac{E_0}{Z_R \cos\theta + jZ_1 \sin\theta} \quad (1)$$

where
$I_R$ is the load current
$E_0$ is the input voltage
$Z_R$ and $Z_1$ are the load impedance and line impedance respectively and
$\theta$ is the length of the line in radians When the line is of a quarter wave length (or an odd multiple thereof) the expression becomes $$I_R = -j\frac{E_0}{Z_1} \quad (2)$$

showing that, if the input voltage is held constant, the load current is independent of the impedance $Z_R$ of the load.

It follows, therefore, that if, for the in-phase network, the lengths of line from 17 to the several antenna elements are of an odd number of quarter wave lengths then the currents to the elements will be unaffected by the impedance of the elements. This becomes important when operation is changed from the nominal operating frequency to some other frequency. The nominal operating frequency is that for which the lengths of line sections are exact quarter or half wave sections and operation at the nominal operating frequency was assumed in the previous descriptions. When the operation is at some moderately different frequency the departure of the sections from exact quarter or half wave length is not material but the change in impedance of the antenna elements may be material. Therefore making the currents fed to the elements independent of their impedances is advantageous.

However for the anti-phase network where the electrical lengths from point 17 to each element is an even number of quarter wave lengths Equation 1 becomes $$I_R = \frac{E_0}{Z_R} \quad (3)$$

which shows that the currents fed to the elements depend directly on their impedance. To obviate this difficulty the resistor 25 is placed in shunt with the anti-phase line at a quarter wave length distance from the point 17. If this resistor is small compared with the line impedance, the voltage at its terminals will be stabilized so that the distance from 25, now considered as the source, to each antenna element via the anti-phase network is also an odd number of quarter wave lengths and the currents supplied by this network will also be independent of the impedance of the elements. It will be evident that power is lost in resistor 25, but its contribution in making the operation independent of impedance variations of the antenna elements warrants its use. Theoretically, it can be shown that, with passive circuit elements, quadrature currents can only be obtained by employing a lossy network and the use of a stabilizing resistor, such as resistor 25, is a requisite to stable operation.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a linear antenna array having a conjugate pair of antenna elements symmetrically spaced relative to a center position, a system for supplying to the elements of said pair energy of a chosen frequency in predetermined amplitude and in conjugate phase relation, the energy supplied to each element being resolvable into a component of reference phase and a component of quadrature phase, said system comprising a source of wave energy, an in-phase circuit supplying a portion of said energy in reference phase to each of said elements, the circuit path from said source to each element being an odd number of quarter wave lengths, an anti-phase circuit supplying a portion of said energy in quadrature phase to each of said elements, the circuit path from said source to each element being an even number of quarter wave lengths, energy dissipative means shunting said anti-phase circuit path at an odd number of quarter wave lengths from each of said elements, said circuits together comprising, a hybrid ring balancing circuit for independently supplying the components of reference phase to the elements of said pair and the components of quadrature phase in antiphase relation to the elements of said pair.

2. In a linear antenna array having a plurality of conjugate pairs of antenna elements symmetrically spaced relative to a center position, a system for supplying to the elements of each conjugate pair energy of a chosen frequency in predetermined amplitude and in conjugate phase relation, the energy supplied to each element being resolvable into a component of reference phase and a component of quadrature phase, said system comprising a plurality of hybrid ring circuits, one for each pair, for independently supplying the components of reference phase to the elements of the pair and the components of quadrature phase in anti-phase relation to the elements of the pair, said plurality of hybrid ring circuits having a common path of a half wave length.

3. In a lobe switching linear antenna array having a conjugate pair of antenna elements symmetrically spaced relative to a center position, a system for supplying to the elements of said conjugate pair energy of a chosen frequency in predetermined amplitude and in conjugate phase relation, the energy supplied to each element being resolvable into a component of reference phase and a component of quadrature phase, said system comprising passive circuit means for independently supplying the components of reference phase to the elements of the pair and the components of quadrature phase in anti-phase relation to the elements of the pair, and means for periodically reversing said anti-phase relation correspondingly to reverse said conjugate phase relation.

4. In a lobe switching linear antenna array having a conjugate pair of antenna elements symmetrically spaced relative to a center position, a system for supplying to the elements of said conjugate pair energy of a chosen frequency in predetermined amplitude and in conjugate phase relation, the energy supplied to each element being resolvable into a component of reference phase and a component of quadrature phase, said system comprising a hybrid circuit means for independently supplying the components of reference phase to the elements of the pair and the components of quadrature phase in anti-phase relation to the elements of the pair, and means for periodically reversing said anti-phase relation correspondingly to reverse said conjugate phase relation.

5. In a lobe switching linear antenna array having a plurality of conjugate pairs of antenna elements symmetrically spaced relative to a center position, a system for supplying to the elements of each conjugate pair energy of a chosen frequency in predetermined amplitude and in conjugate phase relation, the energy supplied to each element being resolvable into a component of reference phase and a component of quadrature phase, said system comprising for each pair, hybrid circuit means for independently supplying the components of reference phase to the elements of the pair and the components of quadrature phase in anti-phase relation to the elements of the pair, and means for periodically reversing said anti-phase relation correspondingly to reverse said conjugate phase relation.

6. In a lobe switching linear antenna array having a conjugate pair of antenna elements symmetrically spaced relative to a center position, a system for supplying to the elements of said pair energy of a chosen frequency in predetermined amplitude and in conjugate phase relation, the energy supplied to each element being resolvable into a component of reference phase and a component of quadrature phase, said system comprising a hybrid ring circuit having three balanced input positions and a pair of output positions symmetrically located relative to a one of said input positions, means connecting said elements each to an output position, means for supplying the components of reference phase at said one input position and switching means for alternately supplying the components of quadrature phase at the two other input positions.

7. In a lobe switching linear antenna array having conjugate pairs of antenna elements symmetrically spaced relative to a center position, a system for supplying to the elements of each conjugate pair energy of a chosen frequency in predetermined amplitude and in conjugate phase relation, the energy supplied to each element being resolvable into a component of reference phase and a component of quadrature phase, said system comprising a source of wave energy, an in-phase circuit supplying a portion of said energy in reference phase to each of said elements, the circuit path to each element being an odd number of quarter wave lengths, an anti-phase circuit supplying a portion of said energy in quadrature phase to each of said elements, the circuit path to each element being an even number of quarter wave lengths, energy dissipative means shunting said anti-phase circuit at an odd number of quarter wave lengths from each of said elements, said circuits together comprising for each pair passive circuit means for independently supplying the components of reference phase to the elements of each pair and the components of quadrature phase in anti-phase relation to the elements of each pair, and means for periodically reversing said anti-phase relation correspondingly to reverse said conjugate phase relation.

8. In a linear antenna array having a conjugate pair of antenna elements symmetrically spaced relative to a center position, a system for supplying to the elements of said pair energy of a chosen frequency in predetermined amplitude and in conjugate phase relation, the energy supplied to each element being resolvable into a component of reference phase and a component of quadrature phase, said system comprising a source of wave energy, an in-phase circuit supplying a portion of said energy in reference phase to each of said elements, the circuit path from said source to each element being an even number of quarter wave lengths, an anti-phase circuit supplying a portion of said energy in quadrature phase to each of said elements, the circuit path from said source to each element being an odd number of quarter wave lengths, energy dissipative means shunting said in-phase circuit path at an odd number of quarter wave lengths from each of said elements, said circuits together comprising a hybrid ring balancing circuit for independently supplying the components of reference phase to the elements of said pair and the components of quadrature phase in anti-phase relation to the elements of said pair.

9. In a linear antenna array having a conjugate pair of antenna elements symmetrically spaced relative to a center position, a system for supplying to the elements of said pair energy of a chosen frequency in predetermined amplitude and in conjugate phase relation, the energy supplied to each element being resolvable into a component of reference phase and a component of quadrature phase, said system comprising a source of wave energy, an in-phase circuit supplying a portion of said energy in reference phase to each of said elements, the circuit path from said source to each element being $n$ quarter wave lengths where $n$ is an integer; an anti-phase circuit supplying a portion of said energy in quadrature phase to each of said elements, the circuit path from said source to each element being $n\pm1$ quarter wave lengths; energy dissipative means shunting the one of said circuit paths which is of an even number of quarter wave lengths at an odd number of quarter wave lengths from each of said elements, said circuits together comprising a hybrid ring balancing circuit for independently supplying the components of reference phase to the elements of said pair and the components of quadrature phase in anti-phase relation to the elements of said pair.

LEONARD HATKIN.
    JOHN RUZE.

References Cited in the file of this patent

UNITED STATES PATENTS

| Number | Name | Date |
|---|---|---|
| 2,187,015 | Cork et al. | Jan. 16, 1940 |
| 2,286,839 | Schelkunoff | June 16, 1942 |
| 2,318,237 | Lindenblad | May 4, 1943 |
| 2,397,645 | Brown | Apr. 2, 1946 |
| 2,411,034 | Gluyas | Nov. 12, 1946 |
| 2,415,932 | Brown | Feb. 18, 1947 |
| 2,445,895 | Tyrrell | July 27, 1948 |